Figure 1:
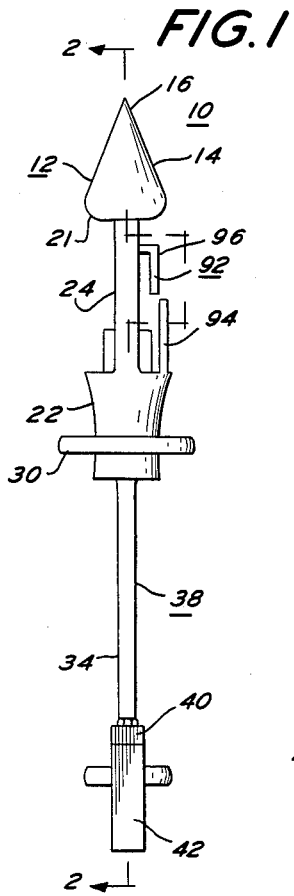

March 1, 1966 W. W. MAYS 3,237,490
REPAIR MEANS FOR INFLATABLE MEMBERS
Filed Oct. 16, 1963

INVENTOR.
WILBURT W. MAYS
BY
Jacob Trachtman
ATTORNEY

United States Patent Office 3,237,490
Patented Mar. 1, 1966

3,237,490
REPAIR MEANS FOR INFLATABLE MEMBERS
Wilburt W. Mays, 2020 N. 8th St., Philadelphia, Pa.
Filed Oct. 16, 1963, Ser. No. 316,673
10 Claims. (Cl. 81—15.7)

The invention relates to repair means for inflatable members, and more particularly to repair means for repairing punctures in tubeless type rubber tires.

Prior art tools for repairing inflatable members have a disadvantage in that with the withdrawal of such tools, the repair element is also many times withdrawn or dislodged from its position within the puncture.

It is therefore a principal object of the invention to provide a new and improved repair means for inflatable members allowing the positioning of a repair element within the puncture of the member at the precise location required and having an extent desired.

Another object of the invention is to provide a new and improved repair means for inflatable members which positively clamps with it a repair element for being positioned within the puncture of an inflatable member.

Another object of the invention is to provide a new and improved repair means for inflatable members including means for positively severing and detaching excess material from the repair element before the withdrawal of the tool.

Another object of the invention is to provide a new and improved repair means for inflatable members which allows the removal of the repair means after the positioning of the repair element without disturbing or causing the accidental dislocation and removal of the repair element from the puncture of the member.

Another object of the invention is to provide a new and improved repair means for inflatable members which is efficient in operation, rugged in construction and readily manipulated for repairing punctures in inflatable members.

The above objects of the invention are achieved by providing a repair means for inflatable members comprising a body having a head end for insertion into the opening or puncture of an inflatable member. The head end has a pointed top portion, a base portion with an outwardly extending stop means and a pair of parallel connecting side elements joining the top and base portions and forming an opening therebetween. A clamping plate member is positioned within the opening of the head end and slidably engages its connecting side elements for longitudinal movement within the opening between first and second terminal positions.

A handle means is secured with the base of the head end, and a control means engages the plate member for actuating between its first and second terminal positions the plate member within the opening of the head end of the body.

The top surface of the clamping plate member is positioned proximate the top portion of the head end for clamping therewithin the repair element when the plate member is in its first terminal position, while releasing the repair element when the plate member is actuated by the control means towards its second terminal position.

The base portion of the head end has an upwardly extending tooth, and the clamping plate member has a downwardly extending blade which is proximately positionable with respect to the tooth for severing the clamping end of a repair element when the blade member is actuated from its first terminal position towards its second terminal position. The tooth and blade provide a space for receiving the repair element therebetween when the plate is positioned proximate its first terminal position, while the outwardly extending stop means of the base of said head end is provided with a depressed region for receiving therein the portion of the repair element extending from its clamping end.

The control means includes a rod having a first end for threadedly engaging the clamping plate member for slidably activating the plate member between its first and second terminal positions upon rotation of the rod, and a second end proximate to the handle means which is connected with the tail end of the body. The second end of the rod has a knob means for manually rotating the rod of the control means.

In use, the repair means is threaded with a repair element, such as an elongated rubber strand which has an end clamped with the head end of the repair means and has its extending portion pass between the blade and tooth respectively of the plate member and base portion of the head end, and extend down past the stop means through its depressed region. The head end of the threaded repair means is inserted through the opening or puncture in the inflatable means until its stop means limits its further motion. In this manner, the rubber member is drawn through the puncture to the extent desired and is positioned for providing a plug within the puncture of the inflatable means. The rubber member is positively moved into this position due to the clamping means provided by the repair means positively engaging the end of the repair element. In order to prevent the repair element from being dislodged or withdrawn with the removal of the repair means from the opening or puncture in the inflatable means, the extending clamped end of the repair element is severed or cut to the desired length by the rotation of the rod of the control means. The repair means may now easily be withdrawn without accidentally displacing or removing the repair element which has been positioned within the opening or puncture of the inflatable member. This is so since the repair element, which had been stretched upon being cut, contracts and does not present an elongated extending end which can be caught or is engaged by the head end of the repair means upon its withdrawal through the opening in the inflatable means.

Figure 2:
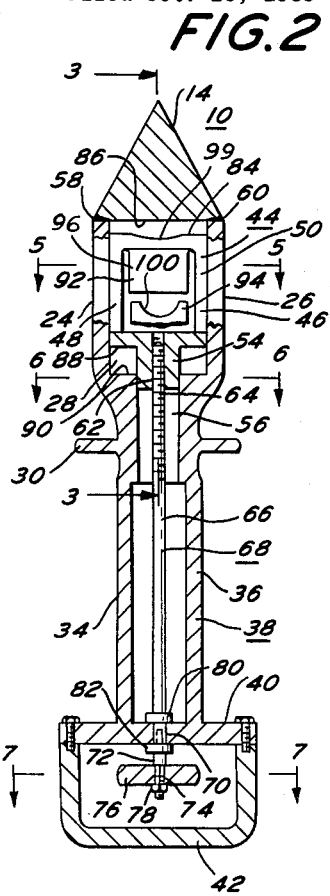
Figure 5:
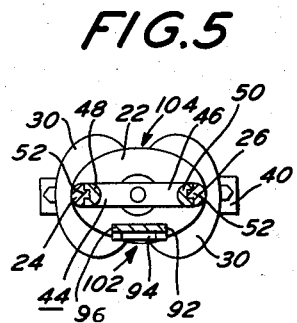
Figure 6:
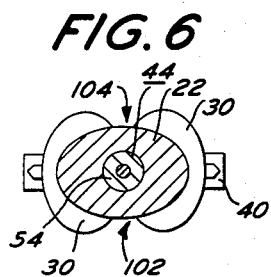
Figure 7:
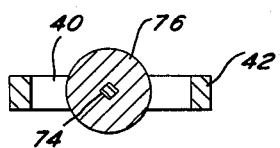
Figure 3:
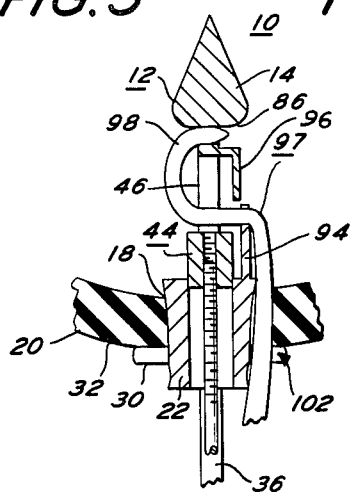
Figure 4:
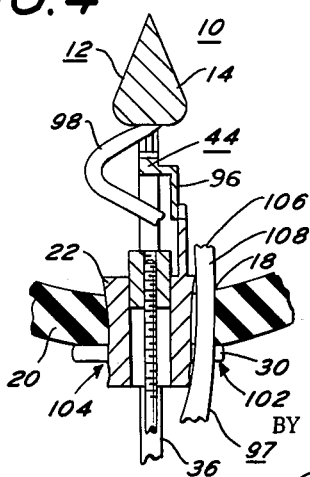

The foregoing objects of the invention will become more apparent as the following detailed description is read in conjunction with the drawings, in which:

FIGURE 1 is a side elevational view of a repair means for inflatable members embodying the invention, FIGURE 2 is a sectional view taken on the line 2—2 of FIGURE 1, FIGURE 3 is a sectional view taken on the line 3—3 of FIGURE 2 illustrating the head end inserted through the opening or puncture of an inflatable member and the end of a repair element threaded through its head end and clamped therewith, FIGURE 4 is a sectional view similar to FIGURE 3 illustrating the severing action of the repair means with its blade and cutting tooth in positions proximate to each other, FIGURE 5 is a sectional view taken on the line 5—5 of FIGURE 2, FIGURE 6 is a sectional view taken on the line 6—6 of FIGURE 2, and FIGURE 7 is a sectional view taken on the line 7—7 of FIGURE 2.

Like reference numerals designate like parts throughout the several views.

Referring to the figures, the repair means 10 embodying the invention includes a head end 12 comprising a top portion 14 provided with a pointed region 16 to assist its insertion through the opening or puncture 18 in an inflatable member 20, such as a tubeless tire. The bottom region may be curved at 21 to allow the ready removal of the head end 12 from the opening or puncture 18 in the member 20.

The head end of the repair means 10 is connected to its base portion 22 by a pair of substantially parallel side elements 24, 26 providing an opening 28 therebetween and within the head end 12.

The base portion 22 is provided with an outwardly extending stop means 30 which engages the outside surface 32 of the inflatable member 20 for limiting the movement of the head end 12 of the means 10 into the opening 18. The bottom of the base portion 22 of the head end 12 is secured with longitudinally extending parallel side elements 34, 36 of the handle means 38 of the repair means 10. The elements 34, 36 are joined to a cross bar 40 at their ends. The ends of the cross bar 40 are connected by a U-shaped guard element 42.

A clamping means 44 for the repair means 10 comprises a plate member 46 with edge portions 48, 50 (see FIGURE 5) having groove means for slidably engaging the track means 52 of the side elements 24 and 26 of the head end 12. The plate member 46 is secured at its bottom with a cylindrical portion 54 which is slidable into an opening 56 extending centrally through the bottom portion 22 of the head end 12 of the means 10. The plate member 44 and its bottom portion 54 may be slidably received into the opening 28 of the head end before the top portion 14 is secured at the sides 58, 60 with the top ends of the side elements 24, 26. The top portion may be secured by welding at locations 58, 60 or any other such suitable means. The bottom portion 54 of the clamping means 44 is provided with a longitudinal threaded opening 62 therethrough which receives and engages the threaded end 64 of the rod 66 of a control means 68. The rod 66 extends parallel and between the side elements 34, 36 and has a portion 70 passing through the cross bar 40 of the handle means 38. The portion 70 of the rod 66 is secured with an extending end 72 which has a rectangular portion 74 receiving thereover a control wheel 76 for manually rotating the rod 66 of the control means 68. The control wheel or knob means 76 is retained in position by a threaded nut 78. The rod 66 and extending portions 72 each respectively provide a stop or bearing plate 80, 82 on opposite sides of the cross bar 40 for positioning and preventing the longitudinal movement of the rod 66 along its axis.

With rotation of the control knob 76 in one direction, such as in the counterclockwise direction, by action of its threadedly engaging end 64, results in the movement of the clamping means 44 in its upward direction into its first terminal position with the top surface 84 of the plate member 50 contacting the undersurface 86 of the top portion 14 of the head end 12. Rotation of the knob means 76 in the opposite, or clockwise direction, results in the sliding movement of the plate member 50 of the clamping means 44 towards its second terminal position with the bottom surface 88 of the means 44 contacting the inside surface 90 of the base portion 22 of the head end 12.

The head end 12 of the means 10 is provided with a severing means 92 for the repair element comprising a tooth 94 extending upwardly from the base portion 22 towards the top portion 14 and parallel to the side elements 24, 26. The plate member 46 of the clamping means is provided with a downwardly extending portion providing a blade 96 parallel to the tooth 94 and spaced to coact therewith in its movement towards the second terminal position of the clamping means 44 to sever a repair element extending therebetween.

In the use of the repair means for repairing an opening or puncture 18 in an inflatable member 20, an elongated repair element 97, which may be made of a rubber material for providing a plug, has its end 98 (see FIGURE 3) clamped between the top surface 84 of the plate member 46 of the clamping means 44 and the bottom surface 86 of the top portion 14. The top surface 84 is provided with an indented portion 99 for centering the end 98 therewithin, as clearly shown in FIGURE 2.

The element 97, before having its end 98 clamped, as described before, is threaded between the blade 96 and tooth 94 in the space afforded by the indentation 100 which also tends to center the position of the element 97. The element 97 thereafter extends along the side of the tooth 94 and through the depressed region 102 of the depressed regions 102, 104 on opposite sides of the stop means 30. The recessed region 102 also serves to position the element 97 with respect to the means 10 for insertion through the opening or puncture 18 of the member 20. The depressed region 104 may be utilized for the same purpose when the extending end of the repair element passes along the opposite side of the repair means 10.

With the insertion of the head end 12 of the means 10 through the opening or puncture 18 of the member 20, as shown in FIGURE 3, the repair element 97 is extended into and retained in position through the opening 18 along side the means 10. In order to remove the means 10 without dislodging or causing the removal of the repair element 97 by the withdrawal or removal of the means 10, the following steps are taken in using the means 10. The control means 68 is actuated by rotating the knob means 76 for causing the plate member 46 of the clamping means 44 to move downwardly towards its second terminal position. When this occurs, the end 98 of the element 97 is released from and is no longer clamped with the means 10. Continued actuation of the control means 68 causes the blade 96 to coact with the tooth 94 and sever the end portion 98 of the element 97 at the point 106, as clearly shown in FIGURE 4. The shortened end 108 of the element 97 which extends through the opening 18 in the inflatable member 20 is free of the means 10 and cannot become entangled therewith. The head end 12 of the means 10 may now be withdrawn from the opening or puncture 18 of the member 12 by the longitudinal actuation of the handle means 38. The curved bottom portion 21 and small size of the top portion 14 of the head end 12 minimize interference or dislodgement of the element 97 extending through the opening 18. With the means 10 completely withdrawn, the portion of the element 97 extending through the puncture or opening 18 remains in position providing a plug filling the opening and sealing the inflatable member. Any portion of the member extending beyond the front surface 32 of the element 97 may be trimmed to provide the desired seal or repair of the inflatable member 20.

The means 10 also provides the advantage of cutting the internally extending end portion of the plug element preventing its flapping about, and reduces unbalancing of the tire by minimizing excess plug material.

It will be obvious to those skilled in the art that the invention may find wide application with appropriate modification to meet the individual design circumstances, but without substantial departure from the essence of the invention.

What is claimed is:

1. Repair means for inflatable members comprising a body having a first end portion with clamping means for clampingly engaging the terminal end of a repair insert element for insertion into the opening of an inflatable member to be repaired, a second end portion connected with said first end portion for handling said repair means, and control means connected with and activating said clamping means for selectively securing and releasing said repair insert element, said clamping means including a cutting means activated by said control means for severing the end of the repair element secured by said clamping means.

2. The means of claim 1 in which the end of the repair element secured by said clamping means is severed with the activation of said control means for releasing said repair element.

3. Repair means for an inflatable member comprising a body having a head end with an opening therethrough for insertion into the opening of an inflatable member to be repaired and an extending end providing a handling means, a clamping element slidable within the opening of the head end of said body for clamping the terminal end of a repair element with the head end of said body within its opening, and control means slidably activating said clamping element for selectively securing and releasing said repair element.

4. The means of claim 3 in which said head end is provided with a longitudinally extending tooth and said clamping element has a blade portion which is positionable proximate to said tooth for severing the clamped end of said repair element when said control means activates said clamping element in the direction for releasing the clamped end of a repair element, said tooth and said blade portion providing an opening therebetween for feeding a repair element therethrough when the clamping element is positioned by said control means proximate its clamping position.

5. The means of claim 4 in which said head end has side track portions and said clamping means includes a plate member having longitudinal side portions providing track means engaging the track portions of said head end for guiding the sliding movement of said clamping means with respect to said head end, and said control means includes an elongated rod having an end threadedly engaging said clamping means for slidably activating the plate member of said clamping means with respect to said head end upon rotation of said rod.

6. The means of claim 5 including stop means projecting outwardly from said body below said head end for limiting the insertion of said head end in the opening of said member to be repaired by engaging said member when in its fully inserted position, said stop means having a non-extending region for receiving therethrough the repair element which has its end received and secured with said head end by said clamping means.

7. Repair means for inflatable members comprising a body having a head end for insertion into the opening of an inflatable member, said head end having a pointed top portion, a base portion with an outwardly extending stop means, and a pair of parallel connecting side elements joining the top and base portions and forming an opening therebetween; a clamping plate member positioned within the opening of said head end and slidably engaging its connecting side elements for longitudinal movement within said opening between first and second terminal positions; handle means secured with the base of said head end; and control means engaging said plate member for actuating said plate member within the opening of said head end of said body between its first and second terminal positions.

8. The means of claim 7 in which said clamping plate member has a top surface which is positionable proximate said top portion for clamping therewith the end of a repair element when in its first terminal position while releasing same when said plate member is actuated by said control means toward its second terminal position.

9. The means of claim 8 in which the base portion of said head end has an upwardly extending tooth and said clamping plate member has a downwardly extending blade which is proximately positionable with respect to said tooth for severing the clamping end of a repair element when said plate member is actuated from its first terminal position toward its second terminal position, said tooth and blade providing a space for receiving said repair element therebetween when said plate is positioned proximate its first terminal position.

10. The means of claim 9 in which said control means includes a rod having a first end threadedly engaging said clamping plate member for slidably activating said plate member between its first and second terminal positions upon rotation of said rod, and a second end proximate said handle means and having knob means for manually rotating the rod of said control means.

References Cited by the Examiner

UNITED STATES PATENTS

| | | | |
|---|---|---|---|
| 622,377 | 4/1899 | March | 81—15.5 |
| 928,069 | 7/1909 | Reich | 81—15.7 |
| 1,069,312 | 8/1913 | Zwiebel | 81—3 |
| 2,507,059 | 5/1950 | Suman | 7—14.1 X |
| 2,544,784 | 3/1951 | Frum | 7—14.1 X |
| 2,914,976 | 12/1959 | Demler | 81—355 X |

FOREIGN PATENTS 805,007 11/1958 Great Britain.

WILLIAM FELDMAN, *Primary Examiner.*

MICHAEL BALAS, *Examiner.*